United States Patent
Huang et al.

(10) Patent No.: US 8,757,481 B2
(45) Date of Patent: Jun. 24, 2014

(54) ELECTRONIC LABEL SYSTEM AND METHOD FOR THE SAME

(71) Applicant: Hardware & Software Technology Co., Ltd., Taoyuan Hsien (TW)

(72) Inventors: Shih-Chien Huang, Taoyuan Hsien (TW); Wen-Liang Hu, Taoyuan Hsien (TW); Chee-Kong Chong, Taoyuan Hsien (TW)

(73) Assignee: Hardware & Software Technology Co., Ltd., Taoyuan Hsien (TW)

( * ) Notice: Subject to any disclaimer, the term of this patent is extended or adjusted under 35 U.S.C. 154(b) by 0 days.

(21) Appl. No.: 13/785,572

(22) Filed: Mar. 5, 2013

(65) Prior Publication Data

US 2013/0240616 A1 Sep. 19, 2013

(30) Foreign Application Priority Data

Mar. 16, 2012 (TW) .............................. 101109187 A

(51) Int. Cl.
*G06F 17/00* (2006.01)

(52) U.S. Cl.
USPC ........................................... 235/375; 235/487

(58) Field of Classification Search
USPC .................... 235/375, 487, 385, 376
See application file for complete search history.

(56) References Cited

U.S. PATENT DOCUMENTS

| | | | |
|---|---|---|---|
| 8,463,647 B2 * | 6/2013 | Sugimoto | 705/14.4 |
| 2009/0273443 A1 * | 11/2009 | Nilsson et al. | 340/5.91 |
| 2009/0295592 A1 * | 12/2009 | Mizukawa et al. | 340/691.5 |
| 2010/0266265 A1 * | 10/2010 | Jung et al. | 386/126 |
| 2011/0193679 A1 * | 8/2011 | Okabe et al. | 340/5.9 |

* cited by examiner

*Primary Examiner* — Edwyn Labaze
(74) *Attorney, Agent, or Firm* — Rosenberg Klein & Lee

(57) ABSTRACT

An electronic label system includes a host and at least one electronic label. The host includes a first control unit for generating a text message, a first storage unit storing a graphic database, and a converting unit configured to convert the text message to a graphic message according to the graphic database. The electronic label is configured to communicate with the host for receiving the graphic message therefrom, and includes a display unit and a second control unit configured to control the display unit to display the graphic message.

11 Claims, 6 Drawing Sheets

ELECTRONIC LABEL SYSTEM AND METHOD FOR THE SAME

CROSS-REFERENCE TO RELATED APPLICATION

This application claims priority of Taiwanese Application No. 101109187, filed on Mar. 16, 2012.

BACKGROUND OF THE INVENTION

1. Field of the Invention

The invention relates to an electronic label system and a method for controlling operation of the electronic label system.

2. Description of the Related Art

A conventional electronic shelf label system (as disclosed in U.S. Patent Application Publication No. US 2002/0002421 A1) has been designed to replace paper-made labels, which need to be printed, cut and pasted manually, every time information of commercial articles printed on the paper-made labels is changed. Generally, a conventional electronic shelf label system includes a host that stores sales information, and a plurality of electronic labels that are operable to receive the sales information from the host and to display the sales information. In order to properly display the sales information, which is in the form of a text message encoded by one of American Standard Code for Information Interchange (ASCII), Unicode and Big-5 code, each of the electronic labels stores a graphic database, and is configured to convert the sales information into a graphic message according to the graphic database. The sales information is then displayed as a graphic message.

However, the graphic database requires a certain amount of physical memory incorporated in each of the electronic labels, and an overall manufacturing cost of the electronic shelf label system may be increased significantly when the number of the electronic labels becomes great. The overall manufacturing cost may be further increased when the electronic shelf label system is to support additional languages.

SUMMARY OF THE INVENTION

Therefore, the object of the present invention is to provide an electronic label system having a relatively low manufacturing cost.

According to one aspect, an electronic label system of the present invention comprises a host and at least one electronic label. The host includes a first control unit for generating a text message, a first storage unit storing a graphic database, and a converting unit coupled to the first control unit and configured to convert the text message to a graphic message according to the graphic database.

The electronic label is configured to communicate with the host for receiving the graphic message therefrom, and includes a display unit and a second control unit coupled to the display unit and configured to control the display unit to display the graphic message.

According to another aspect, an electronic label system is for displaying information of a commercial article that has a barcode associated with the information. The electronic label system comprises a host, an electronic label and a barcode scanner.

The host includes a first control unit, a converting unit coupled to the first control unit, and a first storage unit coupled to the converting unit and storing a graphic database.

The electronic label is configured to communicate with the host, and includes a second control unit, a second storage unit, a display unit and a button.

The second storage unit is coupled to the second control unit and has an identification code uniquely associated with the electronic label. The display unit is coupled to and controlled by the second control unit. The button is coupled to the control unit, and enables the electronic label to transmit the identification code when being pressed.

The barcode scanner is for scanning the barcode of the commercial article to generate a scanning signal associated with the barcode, for communicating with the electronic label to receive the identification code, and for communicating with the host to transmit the scanning signal and the identification code to the host.

When the host receives the identification code and the scanning signal from the barcode scanner, the first control unit is operable to generate a text message according to the scanning signal. The converting unit is operable to convert the text message to a graphic message according to the graphic database. The host is operable to transmit the graphic message to the electronic label uniquely associated with the identification code, so that the second control unit of the electronic label is operable to receive the graphic message and to control the display unit to display the graphic message.

Another object of the present invention is to provide a method for controlling an electronic label system to display information of a commercial article that has a barcode associated with the information. The electronic label system includes a host, a barcode scanner and an electronic label. The method comprises the following steps of:

(a) configuring the electronic label to transmit an identification code that is uniquely associated with the electronic label to the barcode scanner;

(b) using the barcode scanner to scan the barcode of the commercial article and to generate a scanning signal associated with the barcode;

(c) configuring the barcode scanner to transmit the scanning signal and the identification code received in step (a) to the host;

(d) configuring the host to generate a text message according to the scanning signal, and to convert the text message to a graphic message according to a graphic database of the host;

(e) configuring the host to transmit the graphic message to the electronic label uniquely associated with the identification code; and (f) configuring the electronic label to display the graphic message.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
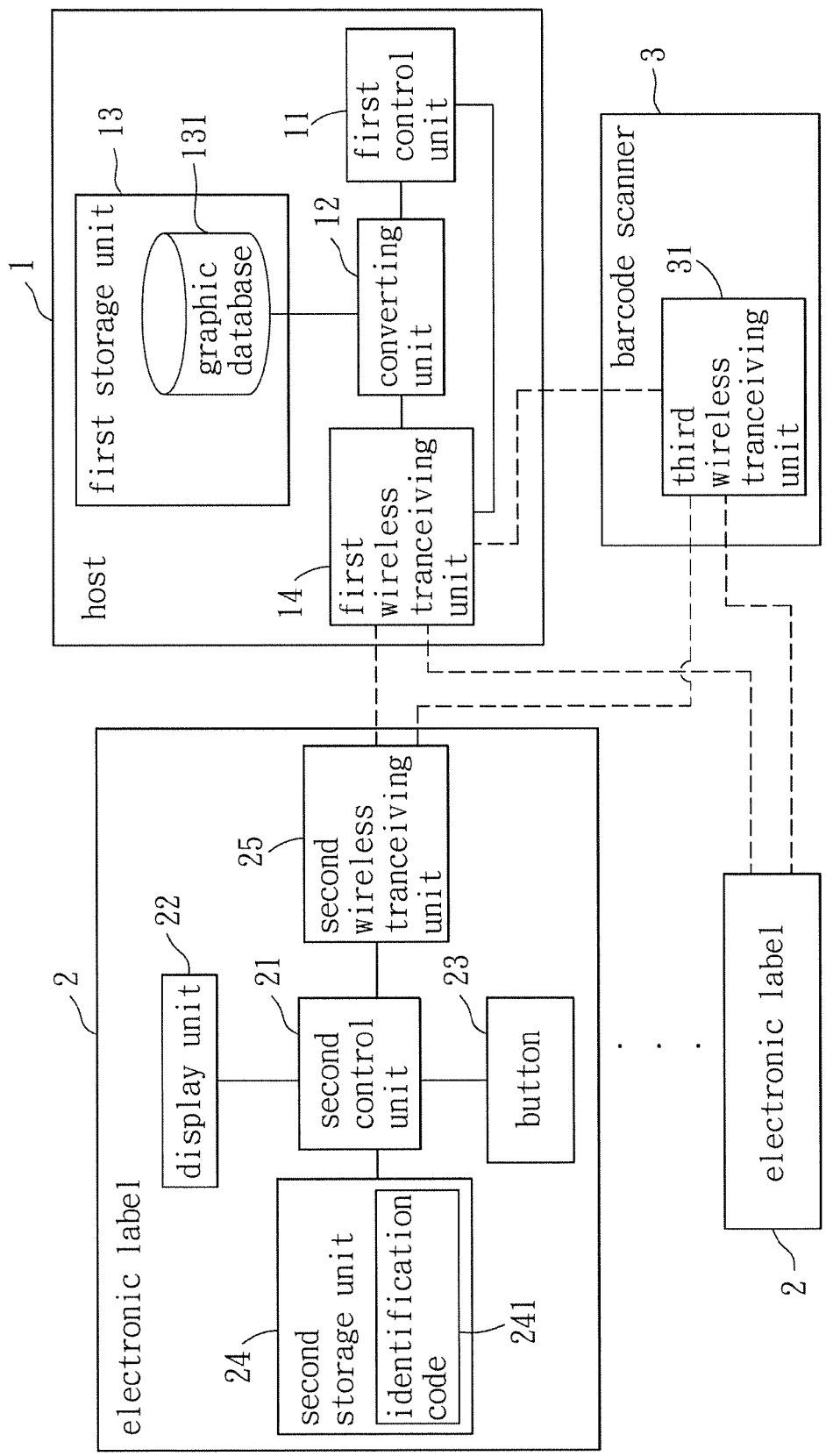
FIG. 1 is a schematic block diagram of a preferred embodiment of an electronic label system according to the invention.
Figure 2:
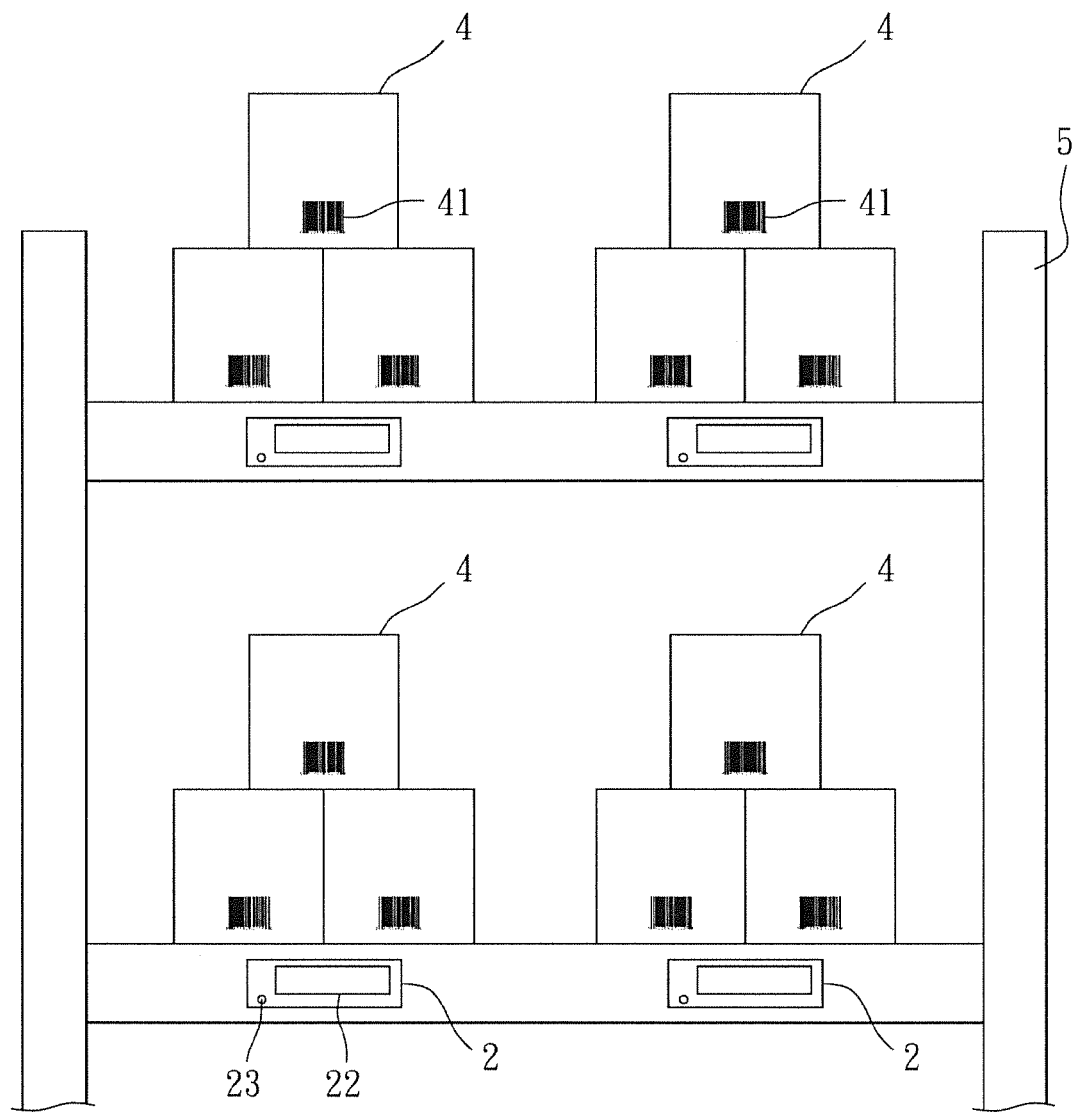
FIG. 2 is a schematic view of a plurality of electronic labels associated respectively with a plurality of groups of commercial articles on a shelf.

As shown in FIGS. 1 and 2, the preferred embodiment of an electronic label system according to the present invention is for displaying information, such as prices, of a plurality of commercial articles 4. The electronic label system comprises a host 1, a plurality of electronic labels 2, and a barcode scanner 3. The commercial articles 4 are sorted and put on a shelf 5, and each of the electronic labels 2 is configured to be disposed on the shelf 5 near a specific group of the commercial articles 4. A packaging of each of the commercial articles 4 has a barcode 41 that is associated with the information of the commercial articles 4.

The host 1 includes a first control unit 11, a converting unit 12, a first storage unit 13 that stores a graphic database 131, and a first wireless transceiving unit 14. The graphic database 131 includes graphic data that corresponds to character codes of a character-encoding system. In this embodiment, the character-encoding system is, but not limited to, one of American Standard Code for Information Interchange (ASCII), Unicode and Big-5 code.

Each of the electronic labels 2 includes a second control unit 21, a display unit 22, a button 23, a second storage unit 24 and a second wireless transceiving unit 25. In this embodiment, the display unit 22 is an electronic paper module, which only consumes electrical power when an image displayed thereon is changed. For each electronic label 2, the second storage unit 24 stores an identification code 241 unique to the electronic label 2.

The barcode scanner 3 is used for scanning the barcode 41 of the commercial article 4 to generate a scanning signal associated with the barcode 41 scanned thereby.

The button 23 enables the second control unit 21 to transmit the identification code 241 to the barcode scanner 3 via the second wireless transceiving unit 25 when the button 23 is pressed. Afterward, the barcode scanner 3 is configured to transmit the identification code received from the electronic label 2 and the scanning signal to the host 1 via a third wireless transceiving unit 31.

The wireless transmission in this embodiment is performed using radio frequency, and other techniques can be used in other embodiments.

Figure 3A:
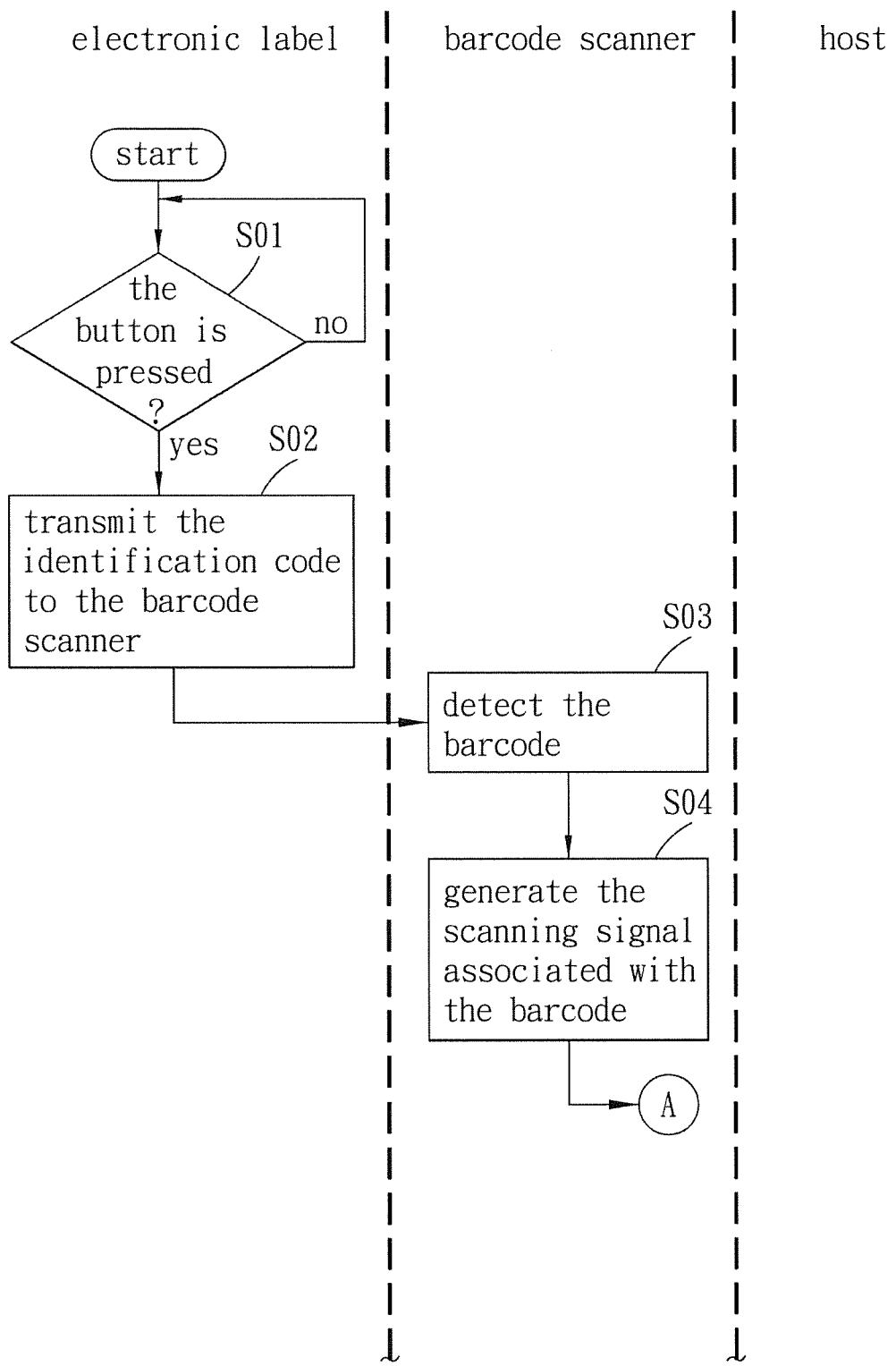
FIGS. 3A-3C is a flow chart of a method for controlling the electronic label system according to the invention; and, FIG. 4 is a schematic view of an example illustrating a graphic message displayed by a display unit of the electronic label of FIG. 1 as a bitmap image.
Figure 3B:
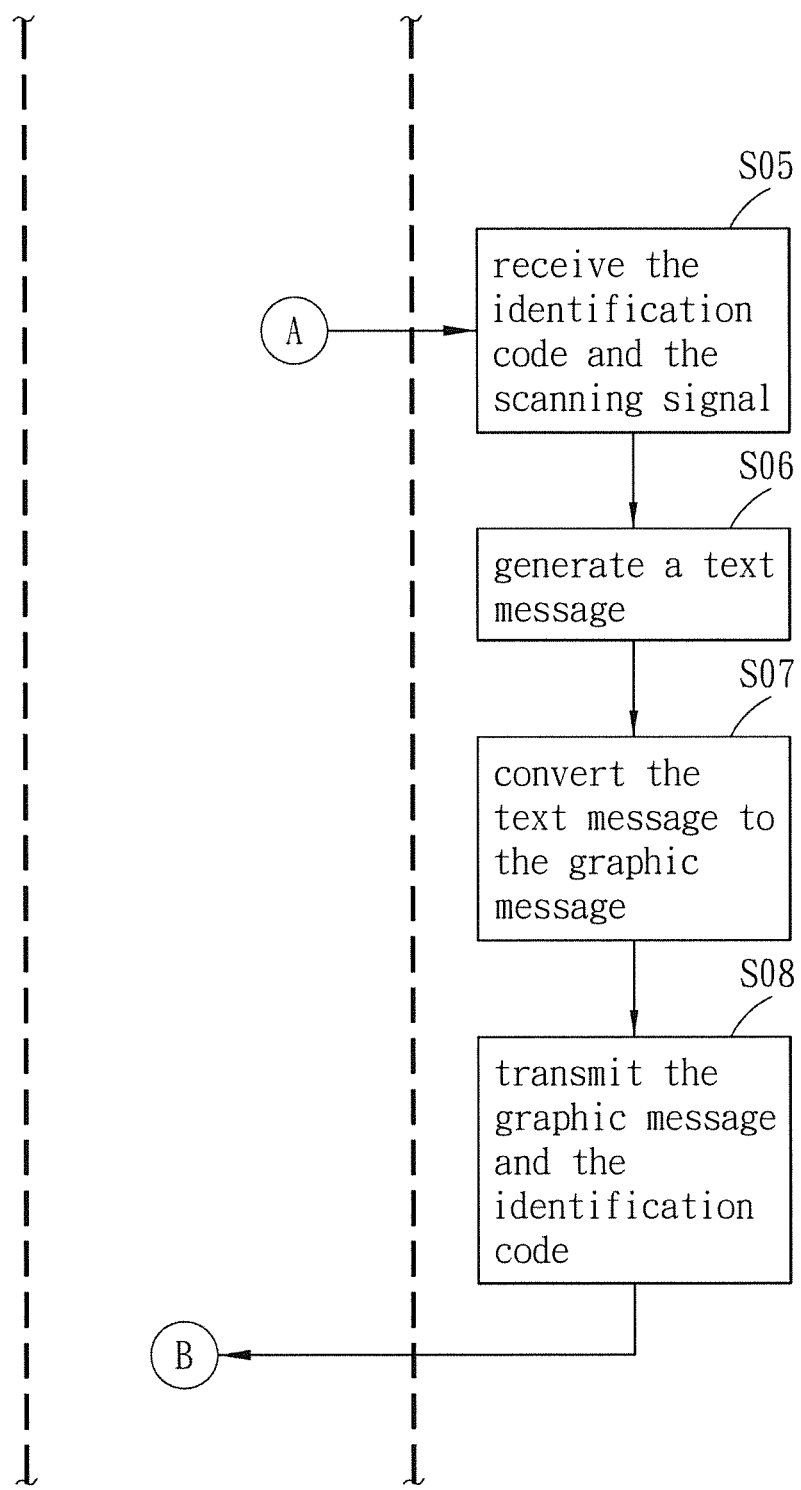
Figure 3C:
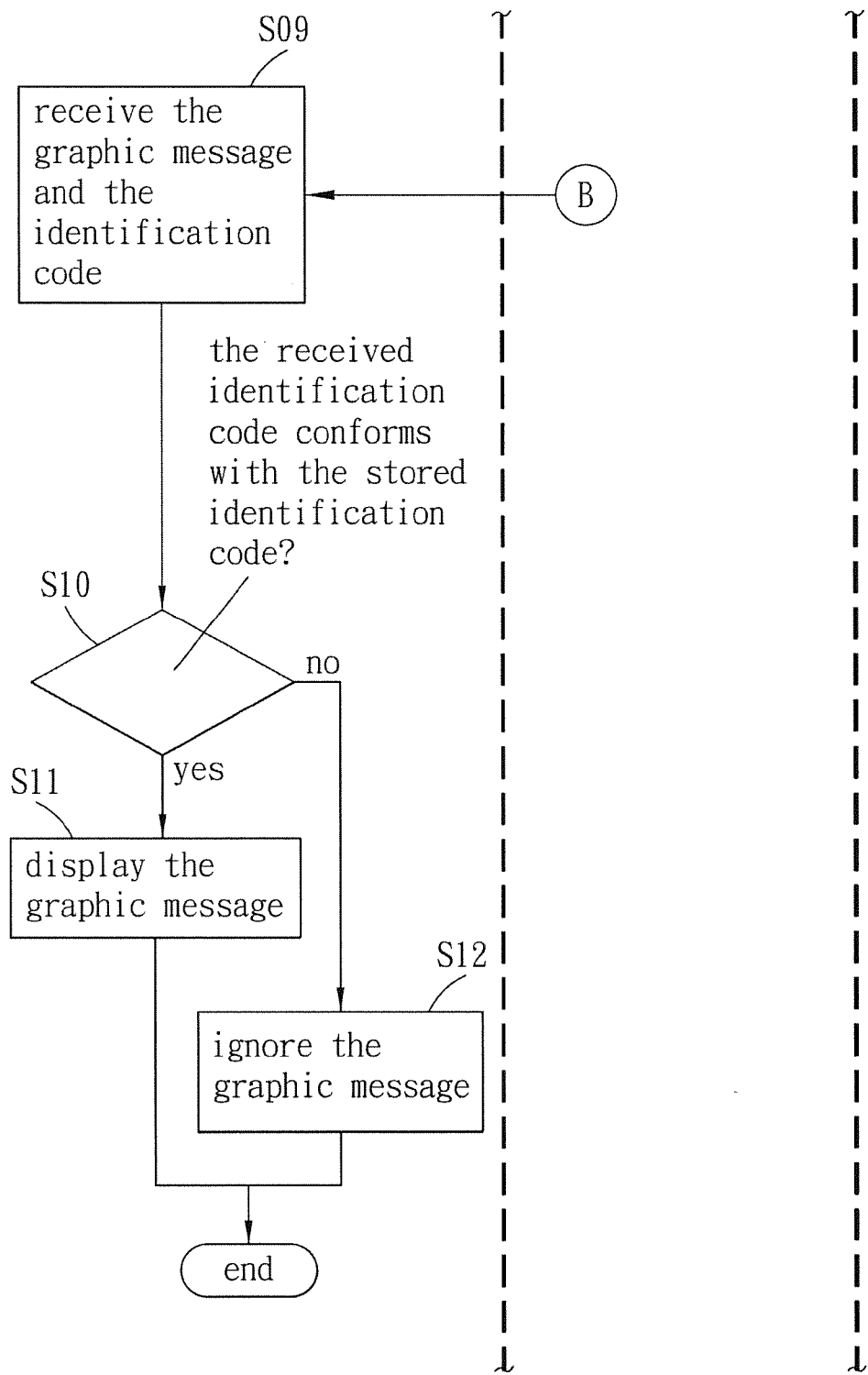

Further referring to FIG. 3, a method for controlling the electronic label system to display information will now be described in detail.

First, for each of the electronic labels 2, the second control unit 21 is operable to determine whether the button 23 is pressed in step S01, and to transmit the identification code 241 to the barcode scanner 3 via the second wireless transceiving unit 25 in step S02 when the button 23 is pressed.

Then, the barcode scanner 3 is operable to detect the barcode 41 of one of the commercial articles 4 within a working range of the barcode scanner 3 in step S03.

In step S04, the barcode scanner 3 is operable to generate the scanning signal associated with the barcode 41 scanned thereby, and to transmit the identification code received in step S02 and the scanning signal thus generated to the host 1 via the third wireless transceiving unit 31 when the barcode 41 of one of the commercial articles 4 is detected.

Afterward, the host 1 is operable to receive the identification code and the scanning signal from the barcode scanner 3 in step S05, and to generate a text message encoded by one of ASCII, Unicode and Big-5 code according to the scanning signal in step S06. Specifically, the text message is associated with the scanning signal, which is related to the information of the scanned one of the commercial articles 4.

Figure 4:
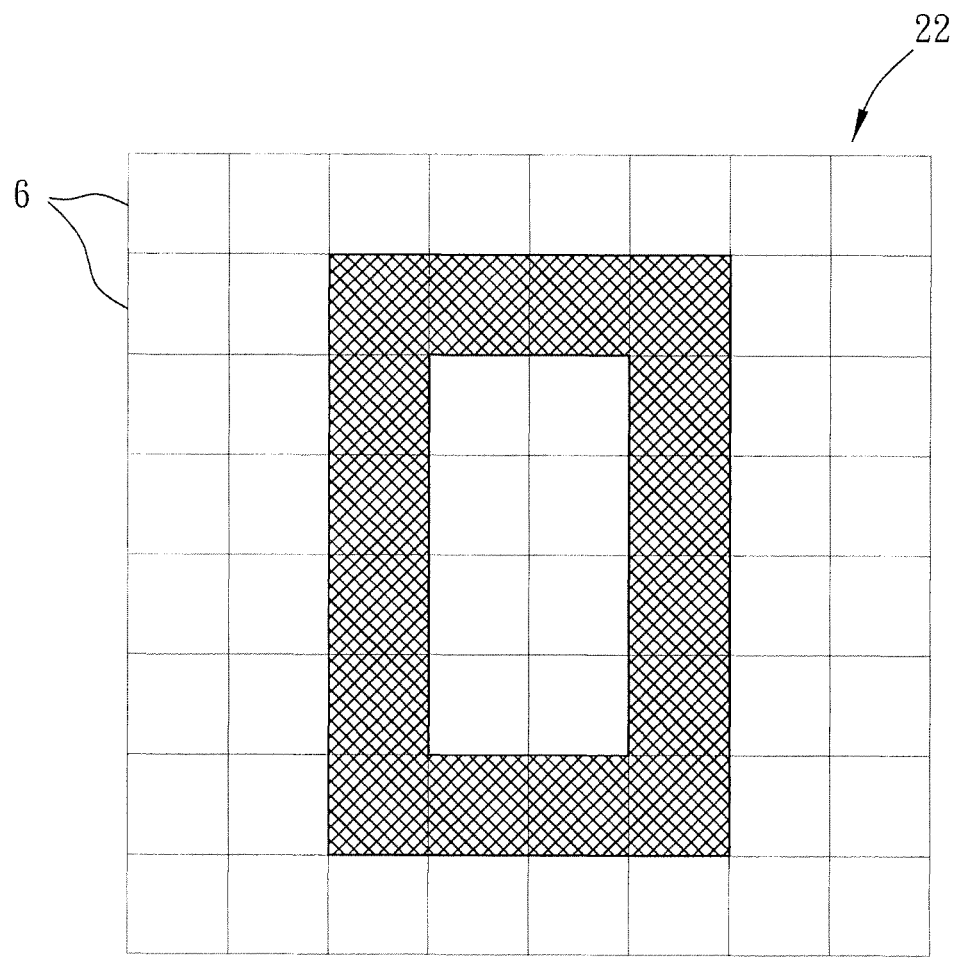

In step S07, the converting unit 12 of the host 1 is operable to convert the text message to the graphic message according to the graphic database 121. In this embodiment, the graphic message is constructed to be displayed as one of a bitmap image and a vector-based representation. For example, FIG. 4 illustrates an 8*8 monochrome bitmap. Each of the squares represents a pixel 6. In this example, the text message includes a number "0", and the converting unit 12 converts the number "0" into the graphic message as shown in FIG. 4. The graphic message therefore can be expressed by the matrix {00000000, 00111100, 00100100, 00100100, 00100100, 00100100, 00111100, 00000000} where the number 0 represents an off state of the pixel 6, and the number 1 represents an on state of the pixel 6.

In step S08, the first wireless transceiving unit 14 of the host 1 is operable to transmit the graphic message generated in step S07 and the identification code received in step S05 to all of the electronic labels 2 that are associated with the host 1.

For each of the electronic labels 2, the second wireless transceiver 25 is operable to receive the graphic message and the identification code from the host 1 in step S09. Afterward, in step S10, the second control unit 21 is operable to determine whether the identification code received in step S09 conforms with the identification code 241 stored in the second storage unit 24. When the determination is affirmative, the flow proceeds to step S11. Otherwise, the flow proceeds to step S12, in which the electronic label 2 ignores the graphic message.

In step S11, the second control unit 21 of the electronic label 2, which has the identification code 241 identical to the identification code received from the host 1 in step S08, is operable to control operation of the second display unit 22 to display the graphic message.

To sum up, the graphic database 131 is stored in the host 1 instead of each of the electronic labels 2, and the converting unit 12 performs the conversion from the text message to the graphic message within the host 1. As a result, each of the electronic labels 2 does not need to have additional memory, and does not to perform any task other than displaying, such that the hardware cost and power consumption of the electronic label system can be significantly reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic label system, comprising:
   a host including:
      a first control unit for generating a text message,
      a first storage unit storing a graphic database, and
      a converting unit coupled to said first control unit and configured to convert the text message to a graphic message according to the graphic database;
   at least one electronic label configured to communicate with said host for receiving the graphic message therefrom, and including a display unit and a second control unit coupled to said display unit and configured to control said display unit to display the graphic message;
   a scanner unit capturing information from a commercial article, said scanner unit being selectively actuated responsive to said electronic label to associate a unique identification code of said electronic label with the captured commercial article information;

wherein said host selectively updates said electronic label associated with the commercial article based on the captured commercial article information and identification code received from said scanner unit.

2. The electronic label system as claimed in claim 1, wherein said display unit is configured to display the graphic message as one of a bitmap image and a vector-based representation.

3. The electronic label system as claimed in claim 1, wherein said first control unit is configured to generate the text message encoded by one of American Standard Code for Information Interchange (ASCII), Unicode and Big-5 code.

4. The electronic label system as claimed in claim 1, wherein, said host further includes a first wireless transceiving unit coupled to said converting unit for transmitting the graphic message, and said electronic label further includes a second wireless transceiving unit configured to communicate wirelessly with said first wireless transmitting unit for receiving the graphic message.

5. The electronic label system as claimed in claim 1, wherein said display unit includes an electronic paper module.

6. An electronic label system for displaying information of a commercial article that has a barcode associated with the information, said electronic label system comprising:
   a host including a first control unit, a converting unit coupled to said first control unit, and a first storage unit coupled to said converting unit and storing a graphic database;
   an electronic label configured to communicate with said host, and including:
      a second control unit,
      a second storage unit coupled to said second control unit and having an identification code uniquely associated with said electronic label,
      a display unit coupled to and controlled by said second control unit, and
      a button coupled to said second control unit, and enabling said electronic label to transmit the identification code when being pressed; and
   a barcode scanner for scanning the barcode of the commercial article, said barcode scanner being selectively actuated responsive to said electronic label to associate the identification code of said electronic label with the barcode, said barcode scanner selectively generating a scanning signal associated with the barcode, said barcode scanner communicating with said electronic label to receive the identification code, and communicating with said host to transmit the scanning signal and the identification code to said host;
   when said host receives the identification code and the scanning signal from said barcode scanner,
      said first control unit is operable to generate a text message according to the scanning signal,
      said converting unit is operable to convert the text message to a graphic message according to the graphic database, and
      said host is operable to transmit the graphic message to said electronic label uniquely associated with the identification code, so that said second control unit of said electronic label is operable to receive the graphic message and to control said display unit to display the graphic message;
   whereby said host selectively updates said electronic label associated with the commercial article based on the barcode and identification code received from said barcode scanner.

7. The electronic label system as claimed in claim 6, wherein said host further includes a first wireless transceiving unit coupled to said converting unit for transmitting the graphic message and the identification code, and said electronic label further includes a second wireless receiving unit configured to communicate wirelessly with said first wireless transceiving unit for receiving the graphic message and the identification code;
   wherein said second control unit is further operable to verify whether the identification code thus received conforms with the identification code stored in said second storage unit, and to control said display unit to display the graphic message when the verification thus made is affirmative.

8. A method for controlling an electronic label system to display information of a commercial article that has a barcode associated with the information, the electronic label system including a host, a barcode scanner and an electronic label, said method comprising the steps of:
   (a) configuring the electronic label to transmit an identification code uniquely associated with the electronic label to the barcode scanner;
   (b) actuating the barcode scanner to scan the barcode of the commercial article, the barcode scanner being actuated to associate the identification code of the electronic label with the barcode of the commercial article responsive to the electronic label, the barcode scanner unit selectively generating a scanning signal associated with the barcode;
   (c) configuring the barcode scanner to transmit the scanning signal and the identification code received in step (a) to the host;
   (d) configuring the host to generate a text message according to the scanning signal, and to convert the text message to a graphic message according to a graphic database of the host;
   (e) configuring the host to transmit the graphic message to the electronic label uniquely associated with the identification code; and
   (f) configuring the electronic label to display the graphic message;
   wherein the host selectively updates the electronic label associated with the commercial article based on the barcode and identification code received from the barcode scanner.

9. The method as claimed in claim 8, wherein:
   in step (e), the host is further configured to transmit the identification code received in step (c) to the electronic label; and
   in step (f), the electronic label is configured to verify whether the identification code received in step (e) conforms with the identification code stored therein, and to display the graphic message when the verification thus made is affirmative.

10. The method as claimed in claim 9, wherein, in step (e), the host is configured to transmit the graphic message and the identification code wirelessly.

11. The method as claimed in claim 8, wherein the display unit is configured to display the graphic message as one of a bitmap image and a vector-based representation.

* * * * *